F. H. PIERPONT.
MACHINE FOR THE PRODUCTION OF TYPE MATRICES OR SIMILAR BODIES.
APPLICATION FILED JAN. 15, 1913.
1,149,538.
Patented Aug. 10, 1915.
12 SHEETS—SHEET 6.
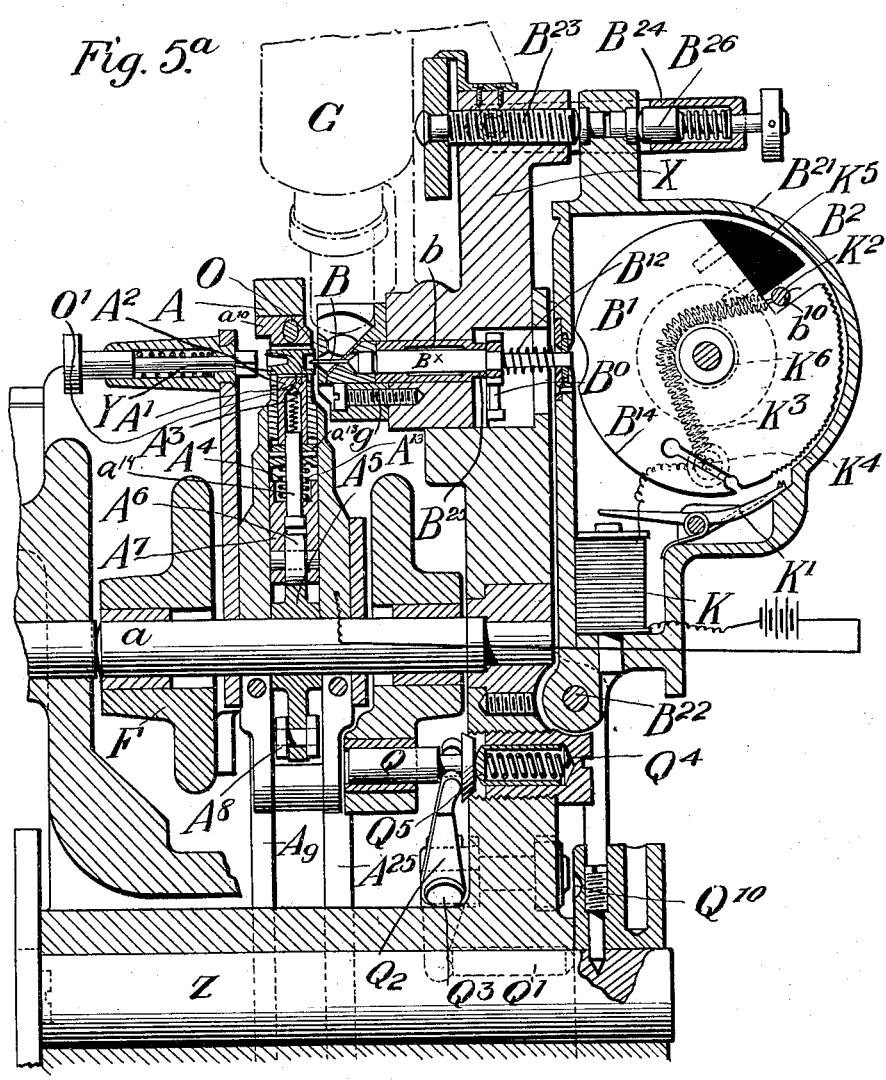

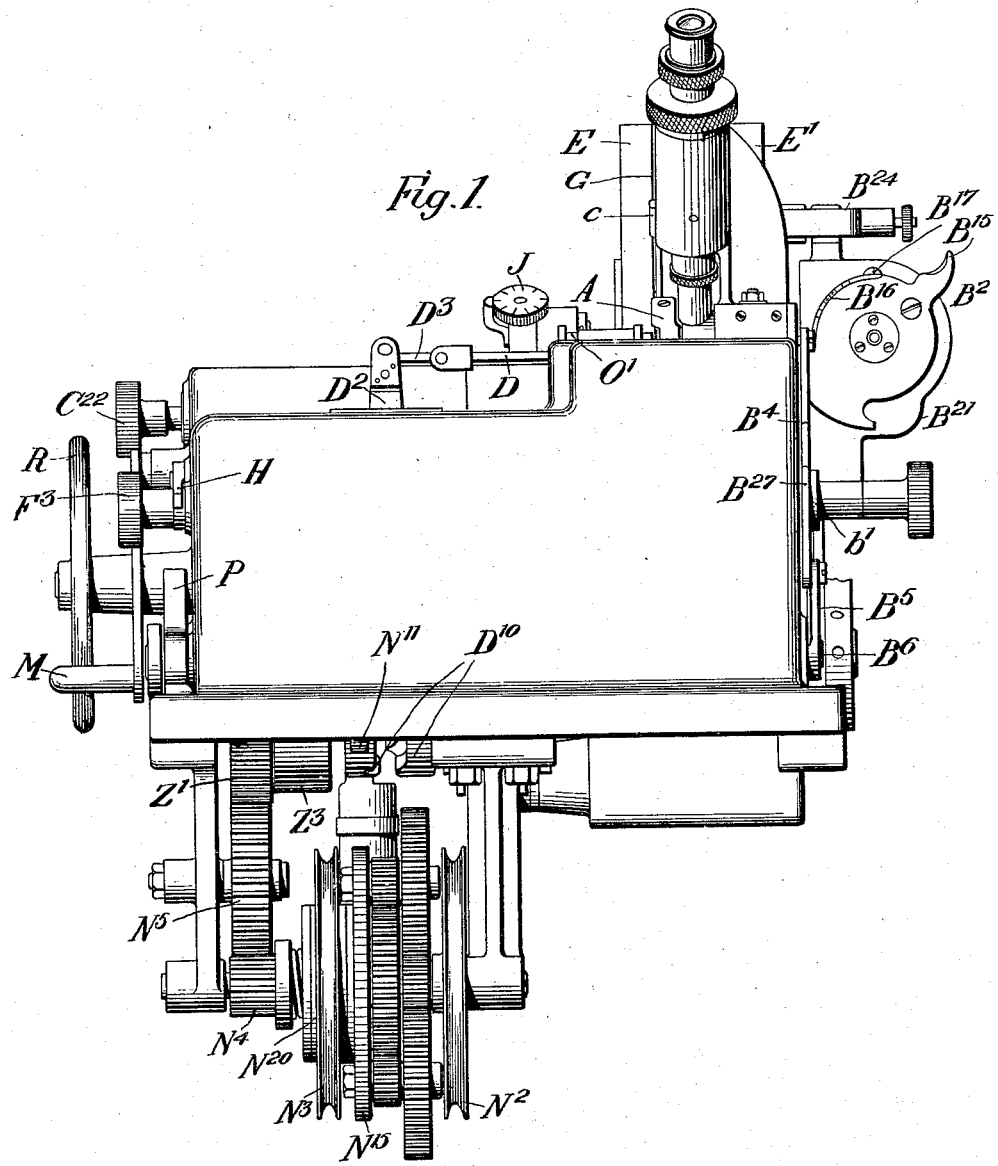

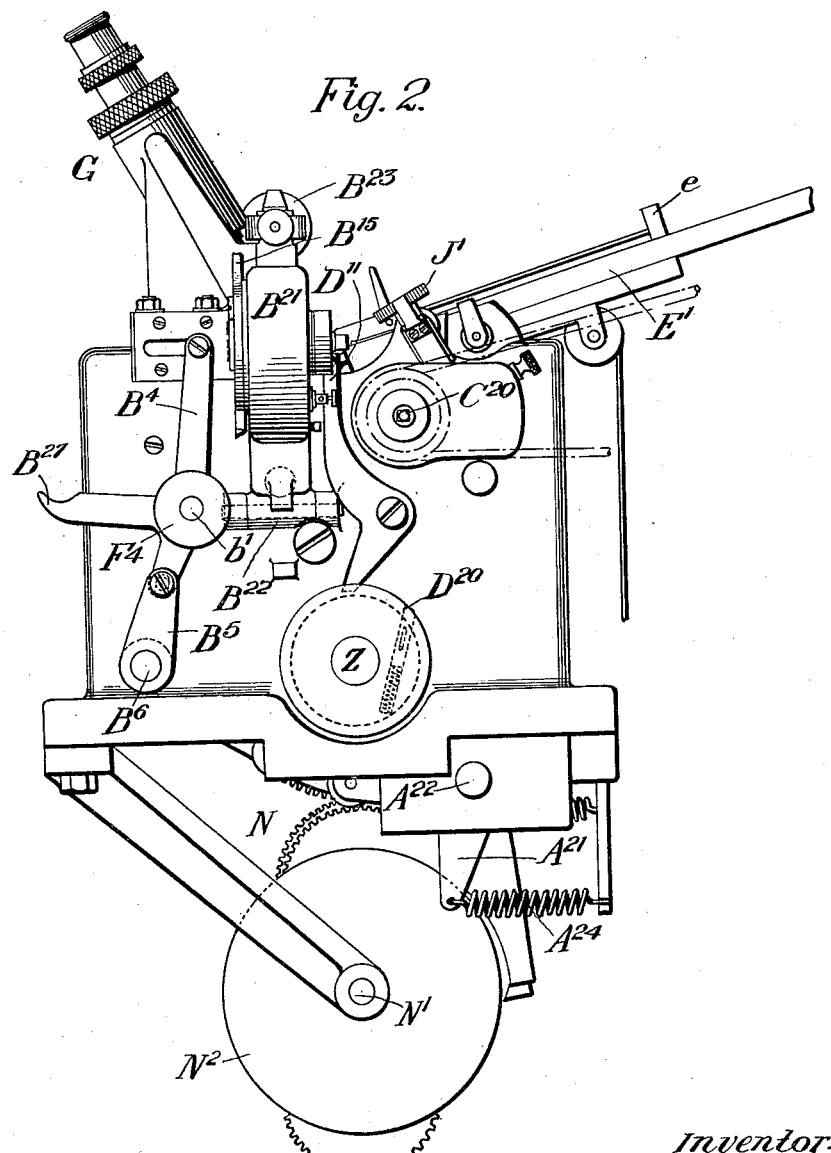

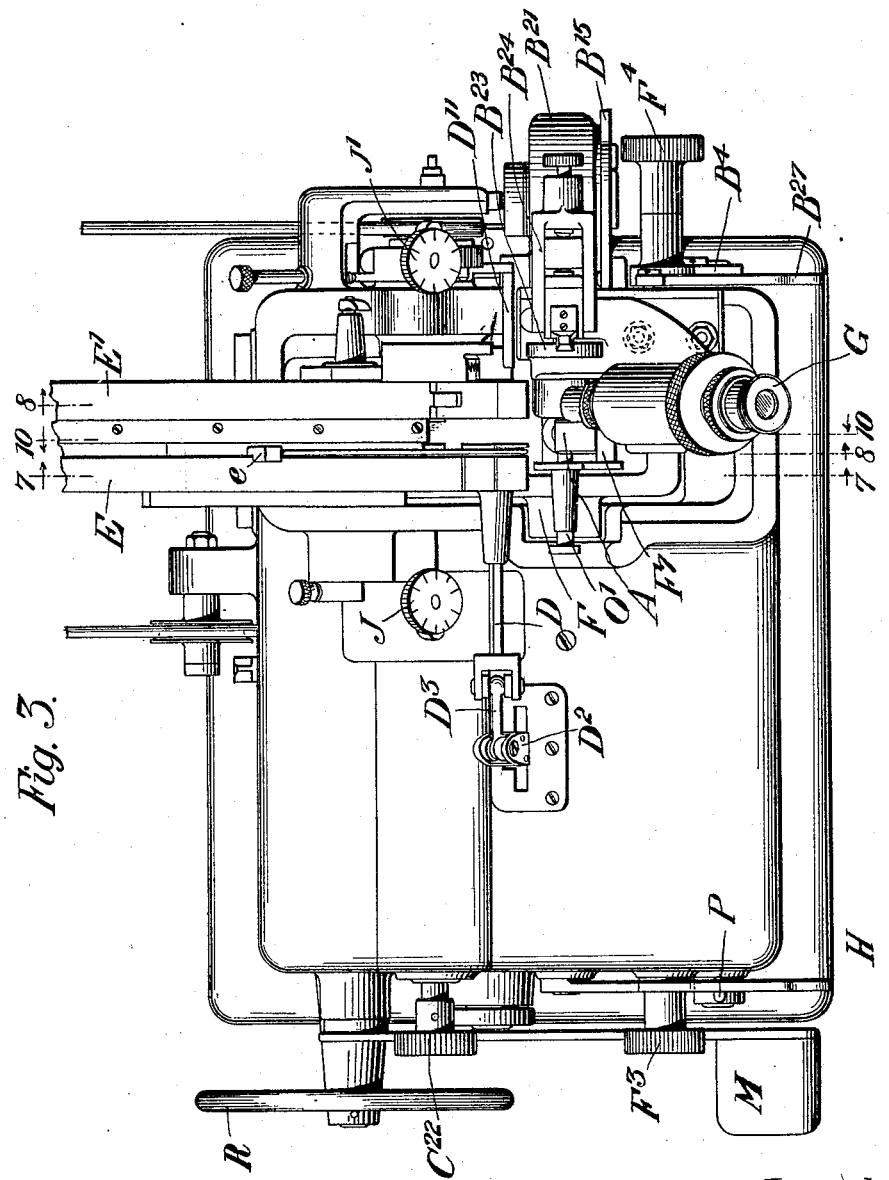

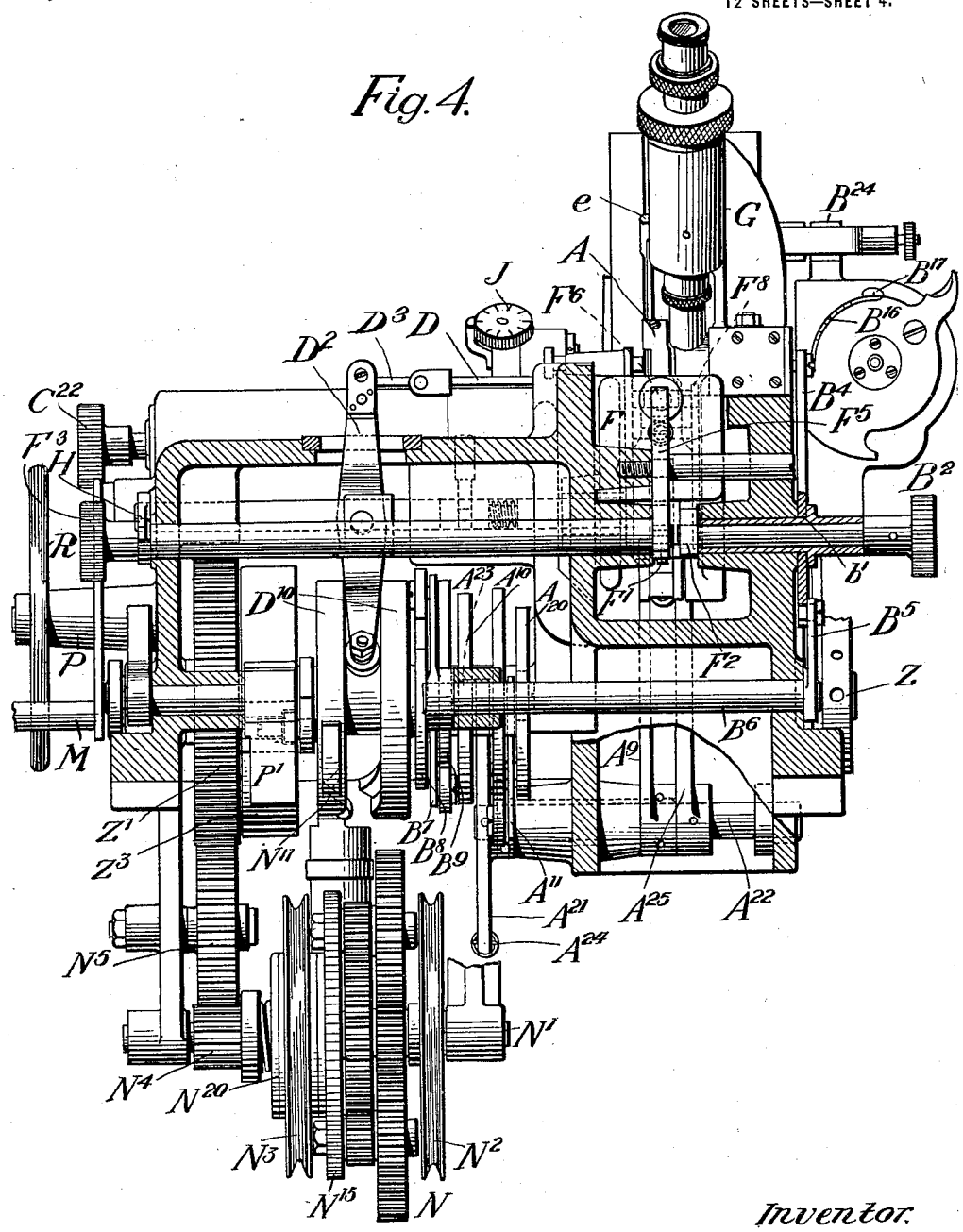

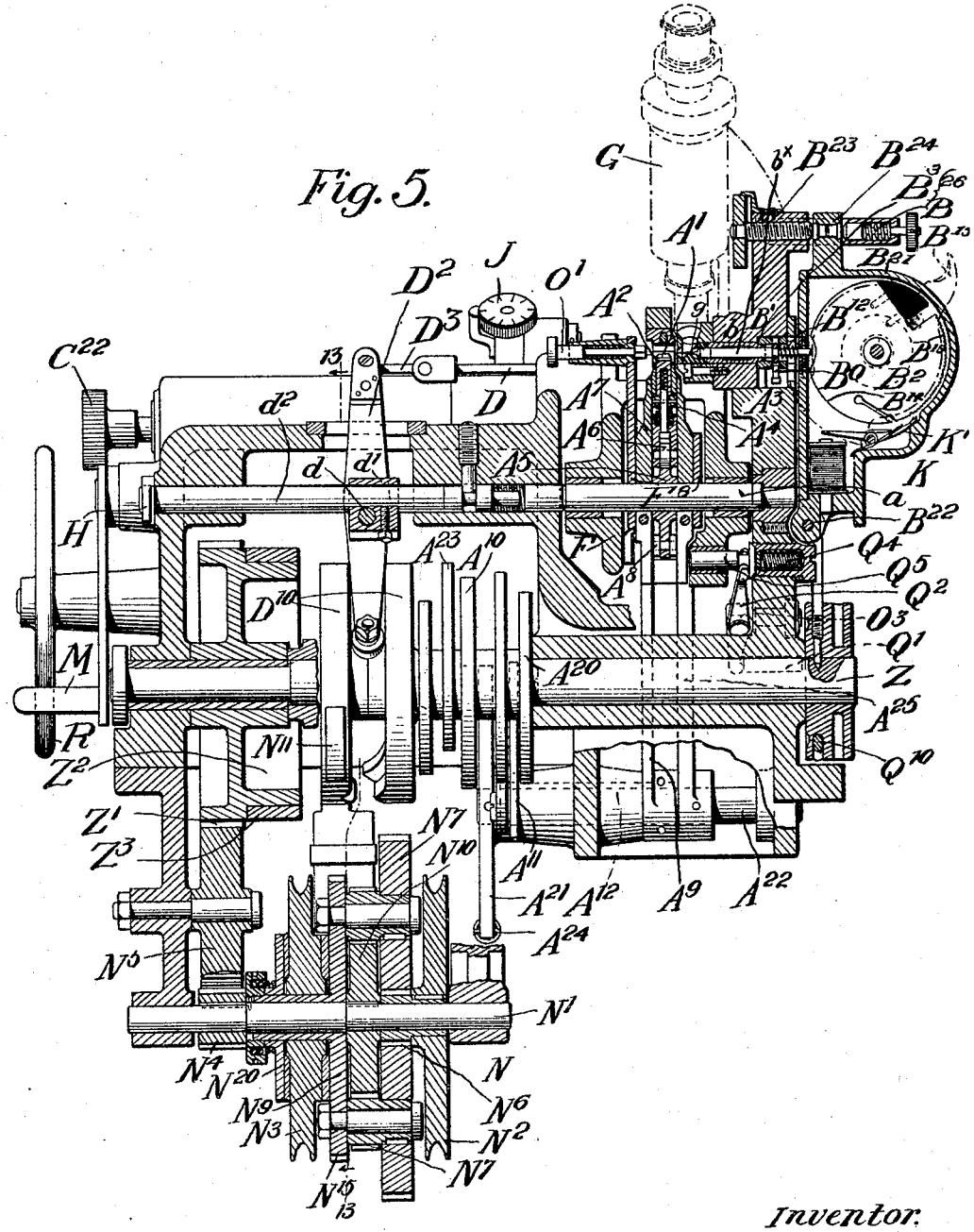

F. H. PIERPONT.
MACHINE FOR THE PRODUCTION OF TYPE MATRICES OR SIMILAR BODIES.
APPLICATION FILED JAN. 15, 1913.
1,149,538.
Patented Aug. 10, 1915.
12 SHEETS—SHEET 7.
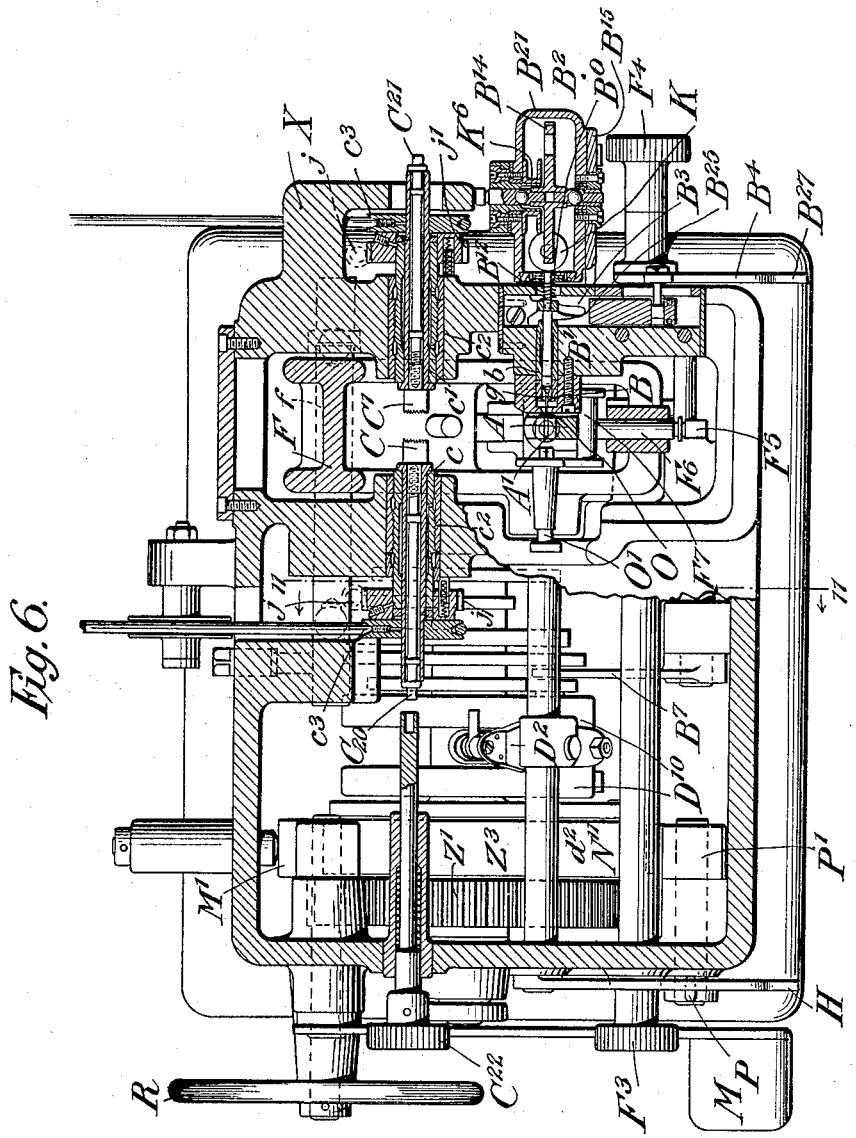

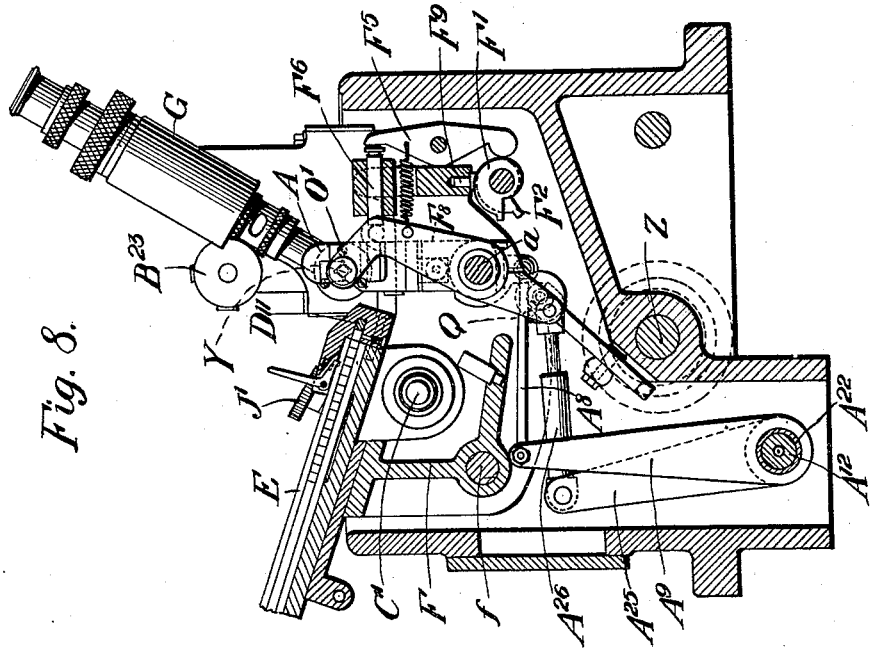

F. H. PIERPONT.
MACHINE FOR THE PRODUCTION OF TYPE MATRICES OR SIMILAR BODIES.
APPLICATION FILED JAN. 15, 1913.
1,149,538.
Patented Aug. 10, 1915.
12 SHEETS—SHEET 9.
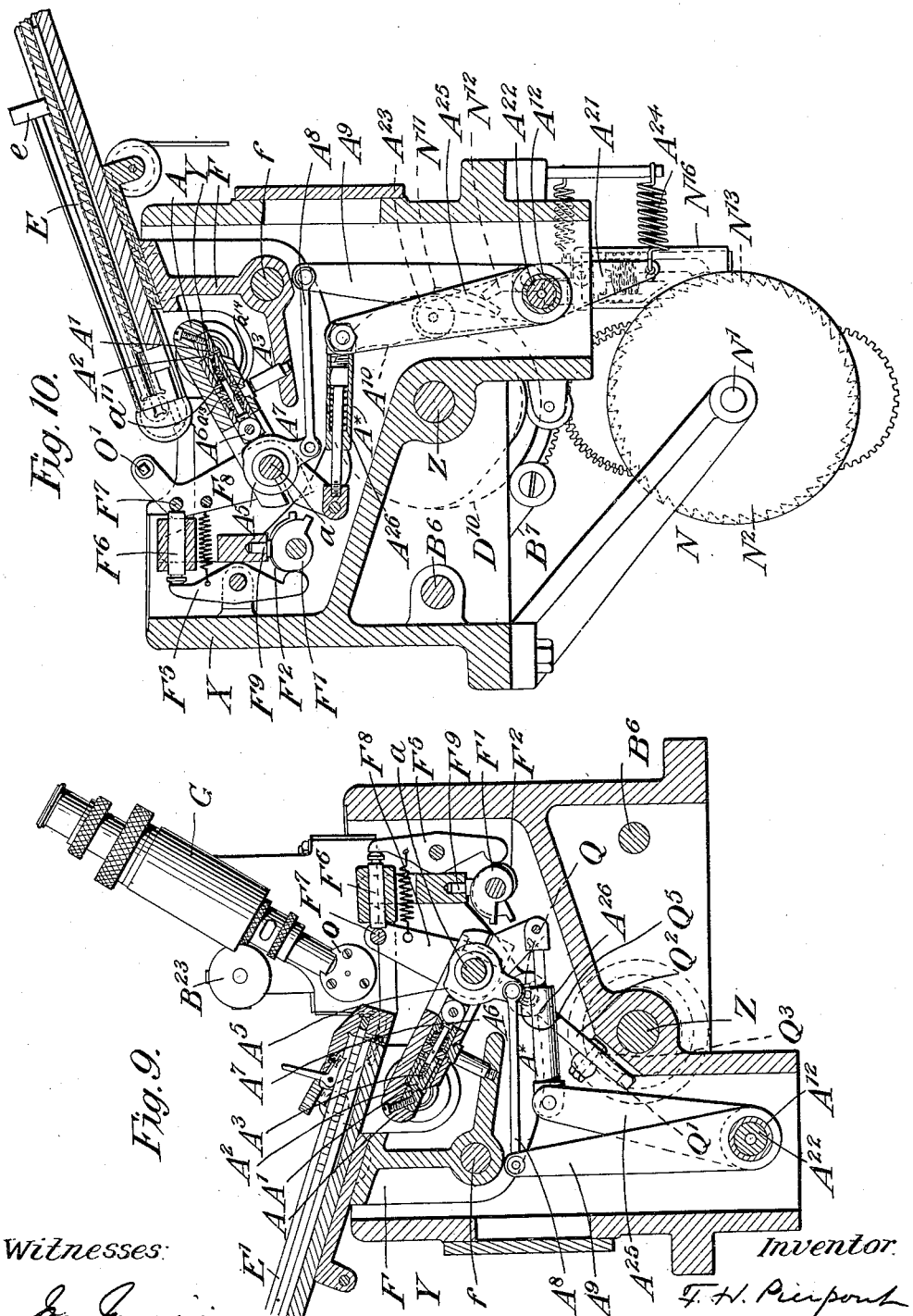
Witnesses:
Inventor.
F. H. Pierpont
by his Attys.

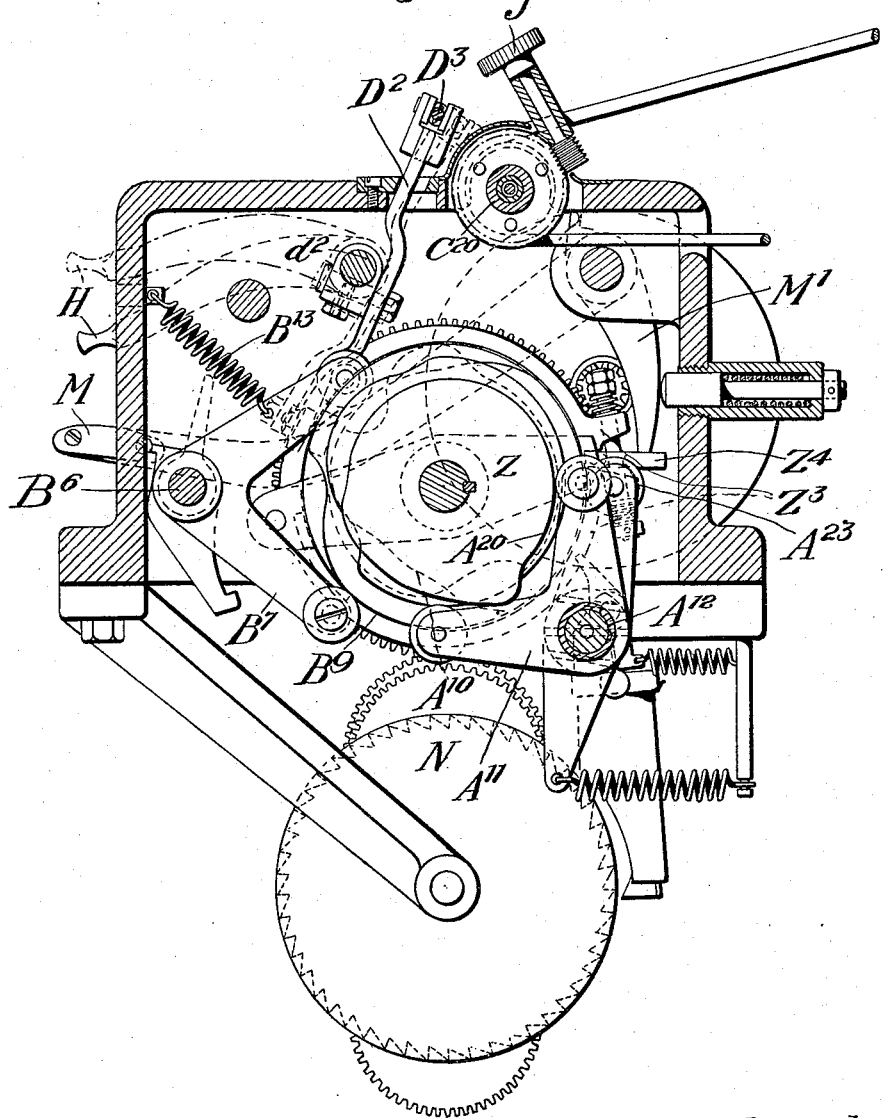

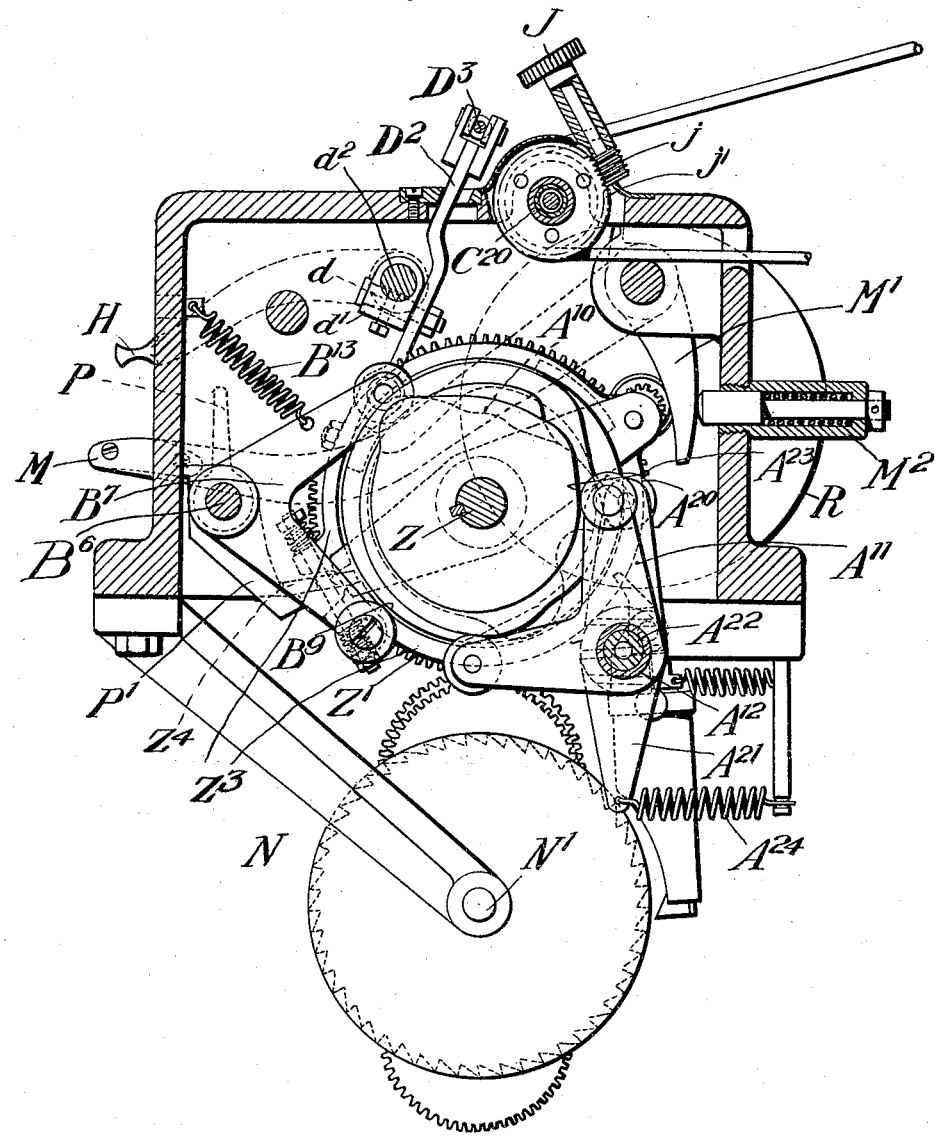

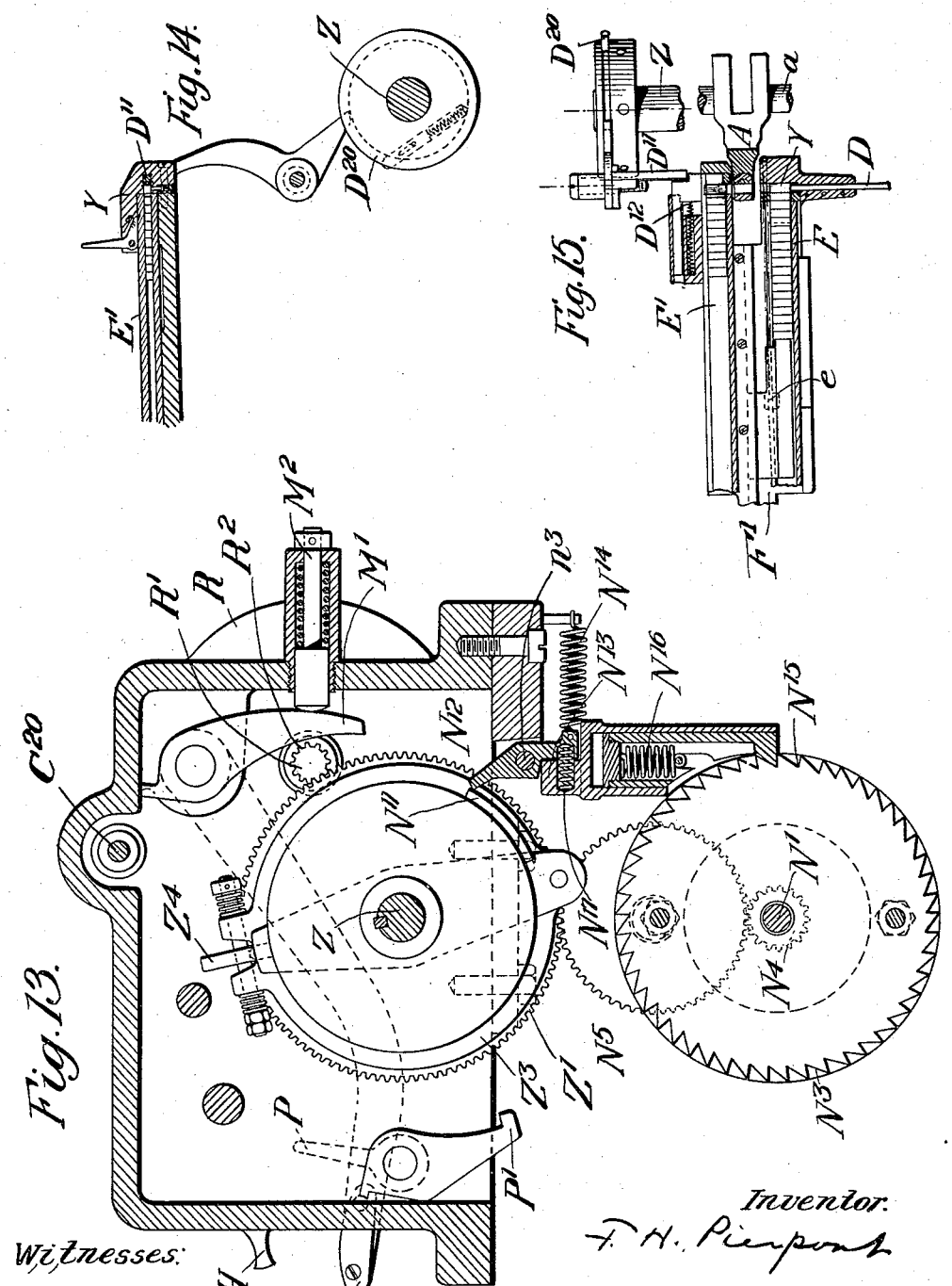

UNITED STATES PATENT OFFICE.

FRANK HINMAN PIERPONT, OF SALFORDS, HORLEY, ENGLAND, ASSIGNOR TO LANSTON MONOTYPE MACHINE COMPANY, OF PHILADELPHIA, PENNSYLVANIA, A CORPORATION OF VIRGINIA.

MACHINE FOR THE PRODUCTION OF TYPE-MATRICES OR SIMILAR BODIES.

1,149,538.    Specification of Letters Patent.    Patented Aug. 10, 1915.

Application filed January 15, 1913. Serial No. 742,204.

*To all whom it may concern:*

Be it known that I, FRANK HINMAN PIERPONT, of Salfords, Horley, in the county of Surrey, England, have invented a certain new and useful Improvement in Machines for the Production of Type - Matrices or Similar Bodies; and I do hereby declare the following to be a full, clear, and exact description of the same, reference being had to the accompanying drawings, forming a part of this specification, and to the figures and letters of reference marked thereon.

This invention relates to apparatus or machines for measuring, justifying and milling type-matrices to accurate length and with accurate depth of drive of the character or symbol. These matrices, which are generally rectangular in form, have a formative cavity with a character or other symbol impression punched or otherwise sunk in one end. They are used chiefly in type casting and composing machines, and a very high degree of accuracy in their dimensions particularly as to length and the depth of the matrix drive or cavity is required, the margin of error allowed being usually less than 2/10,000ths of an inch. These matrices have to pass through a number of processes and this, together with the great accuracy required renders their production costly to counteract which and to insure rapid and accurate production commercially, it is necessary that the machine employed should operate automatically and without necessitating the attention of highly skilled operators.

It is the chief object of the present invention to provide an automatic machine in which the matrix will be milled to correct length and with correct depth of drive or matrix cavity so that the matrices leaving the machine will not only be of accurate and uniform length, within the margin of error allowed, but the depth of the drive will also be correct within the same margin.

According to the present invention, the matrices are automatically fed, singly, to an automatically operated carrier wherein each matrix before reaching the cutters, is directly positioned by an automatically operated needle engaging the character face in the matrix cavity. Further, the cutters or one of them are or is set relatively to the matrix in accordance with a measurement obtained by an adjustable measuring device coöperating with the needle, and previously set from a standard matrix or depth gage. When the matrix has been positioned in the carrier it is automatically locked against accidental displacement. The carrier, together with feeding and delivery galleys, is movable relatively to the needle so as to bring in line therewith a required part of the character or symbol, and this adjustment is performed in view of the operator through a microscope. Also as there is a limit to the speed at which the actual cutting or milling can take place and such speed, if constant during the entire cycle of the machine, would reduce the speed of operation considerably, an automatically operating variable speed gear is provided for the carrier.

The automatic matrix feeding and delivering mechanism which is provided according to this invention for loading and discharging the carrier, can be rendered inoperative at will without interfering with the other movements of the machine. Further, mechanism is provided for arresting the movements of the carrier at various points in the cycle.

The adjustable measuring device coöperating with the needle controls the closing and breaking of an electric circuit so that whenever it touches the needle which is automatically advanced, it effects the closing of the electric circuit and is thereby automatically locked against further advance.

In the accompanying drawings illustrating a preferred form of embodiment—Figure 1 is a front elevation of a machine or apparatus embodying the present invention. Fig. 2 is an end elevation of Fig. 1. Fig. 3 is a plan of Fig. 1. Fig. 4 is a front elevation similar to Fig. 1 but with the casing shown in section. Fig. 5 is a longitudinal section showing the two-speed gear. Fig. 5ª is a vertical section, drawn to a larger scale than the other figures, showing the needle, and the measuring or testing mechanism coöperating therewith. Fig. 6 is a sectional plan showing the cutter or tool holder, measuring needle, etc., in section. Fig. 7 is a transverse section on the line 7—7 Fig. 3, showing the carrier receiving a matrix to be milled. Fig. 8 is a transverse section on the line 8—8 of Fig. 3, showing the carrier in testing or measuring position. Fig. 9 is a transverse section on the line 8—8 Fig. 3, showing the carrier passing a matrix between the tools. Fig. 10 is a transverse section on line 10—10 of Fig. 3, looking toward the left and showing a matrix between the tools. Fig. 11 is a transverse section on the line 11—11, of Fig. 6. Fig. 12 is a section also on the line 11—11 of Fig. 6, showing the parts in different positions. Fig. 13 is a section on the line 13—13 of Fig. 5. Fig. 14 is a section showing the receiving galley and its pusher; and Fig. 15 is a section showing the method of delivering the matrix from the delivering galley to the carrier and also from the carrier to receiving galley.

The same letters designate like parts in the several views.

A is the carrier; B the measuring needle; B' the mechanism for moving the needle automatically to accurately position a matrix in the carrier; $B^2$ the manually controlled mechanism coöperating with the needle either to set the latter according to a standard matrix or to test a matrix; C C' the milling cutters; D the pusher for transferring the matrices between the carrier and galleys E E'; F the cradle for adjusting the carrier relatively to the needle; G the microscope; H the handle for disconnecting the pusher D from its operating mechanism; J J' the handles for adjusting the cutters; K the electric control device for the needle micrometer; M the main control handle; N the variable speed gear; and P the handle for effecting the stopping of the carrier in line with the galleys.

The positioning and measuring needle B which is arranged horizontally (see Figs. 5, $5^a$ and 6) is removably secured in a holder $B^x$ which in turn is mounted in a bearing $b$ in an arm of the machine frame X. The needle is moved forward to position the rough matrix in the carrier A through the mechanism B' controlled conveniently by a cam $B^3$. When moved forward, this needle projects through an anvil or gaging surface O and engages a matrix Y which has already been placed in the carrier A before the latter has been moved opposite to the needle B.

From the position in line with the needle B, the carrier A conveys the matrix between the two opposed rotating cutters C C' (see Figs. 6 and 7). These cutters are mounted on shafts $c\ c'$ turning in suitable bearings $c^2$ which latter are adjustable in the machine frame so that the cutters can be adjusted relatively to one another and to the carriers, and each cutter is provided with a separate drive, conveniently pulley and belt gear $c^3$.

The carrier A is automatically moved between the various stations or positions. Preferably it is mounted upon a shaft $a$ (see Figs. $5^a$, 7, 8, 9 and 10) about which it is turned by a cam $A^{10}$ (Figs. 4 and 5).

The cam $A^{10}$ transmits motion to the carrier A through a lever $A^{21}$ mounted on a shaft $A^{22}$. One end of the lever has a roller $A^{23}$ bearing on the cam and to its other end is secured a spring $A^{24}$ for maintaining the roller in constant contact with the cam (see Fig. 12). To the shaft $A^{22}$ is secured a lever $A^{25}$ (see Figs. 7, 8, 9 and 10) which is connected by a link $A^{26}$ to the carrier A.

The carrier travels at a high rate of speed between the receiving position and the gaging position, from the latter to the cutters, and on its return from the cutters to the delivery position; but when passing the matrix between the cutters, its speed of travel is reduced, through the automatically coming into action of the variable speed gear N (see Figs. 4 and 5). After the matrix has been acted upon by the cutters the carrier conveys it to the delivery position which is also conveniently the receiving position.

In the delivery position the finished matrix is ejected from the opposite side of the carrier to that by which it entered, by the pusher D (see Figs. 4 and 15) which is operated by a cam $D^{10}$ (see Figs. 5 and 6) and after it has ejected a matrix the pusher is drawn back to allow a rough matrix to fall or pass from the galley E in front of the pusher on the next advance of which this matrix is pushed into the carrier.

The setting of the cutters or one of them is determined by a measurement arrived at by a preliminary contacting of the measuring needle B with a standard matrix, or depth gage. To obtain the necessary adjustment for the cutter which is to operate on the matrix cavity end of the matrix, a standard matrix is placed against the anvil or gaging surface O through which the point of the needle B will be projected. Conveniently this standard gage is placed in the carrier A and is held against or advanced against the anvil O by hand pressure applied to a spring controlled pusher O' (see Fig. $5^a$). The standard gage being in position, the sliding cam piece $B^3$ of the mechanism B' (see Figs. $5^a$ and 6) by which the needle is moved automatically for positioning rough matrices in the carrier A, is withdrawn and the needle is advanced into contact with the standard matrix, conveniently by a spring $B^{12}$. Mounted at the rear end of the needle holder is the gaging mechanism $B^2$ which comprises a rotatable cam $B^{14}$ carried upon a horizontal axis to which is also secured a hand lever $B^{15}$ and a micrometer scale $B^{16}$ arranged to be passed in front of a zero mark $B^{17}$ (see Fig. 1). The bearings for the axis of the cam $B^{14}$ are insulated from the casing. On the axis of the cam is also carried a finely toothed segment $B^{18}$ (see Figs. 5 and $5^a$). The mechanism $B^2$ cooperates with the electro-magnetic mechanism K (see Fig. 5ª). The lever B¹⁵ carries an insulated stud K² which passes through a slot $b^{10}$ in the cam B¹⁴ and has connected at its free end one end of a spring K³ the other end of which is attached to an insulated plug K⁴ on the casing. At one end of the slot $b^{10}$ is a piece of insulating material K⁵ against which the pin is normally pressed by the spring K³ which latter rests upon an insulated support K⁶. From the plug K⁴ a wire of the circuit passes to the magnet K and thence to the battery, the other terminal of which is connected to the carrier A. As thus arranged it will be observed that the electric circuit including magnet K is normally broken or open between pin K² and cam B¹⁴. When the lever B¹⁵ is turned downward (Fig. 1) it moves pin K² against the action of the spring K³ into contact with the opposite or uninsulated side of the slot $b^{10}$ thus closing the circuit at this point, and thereafter rotates the cam B¹⁴. Adjacent to the cam is a pawl K' held out of contact with the teeth B¹⁸ by a spring, but arranged to engage and lock the cam when electromagnet K is energized.

The hand lever B¹⁵ rotates the cam B¹⁴ until the latter contacts with the end of the needle holder which, as stated, has been advanced by its spring into contact with the standard matrix when the circuit will be closed, energizing the magnet K which attracts the tail of the pawl K'. The nose of the pawl then engages the toothed segment and thereby locks the cam against further movement. The reading of the scale relatively to the stationary zero mark B¹⁷ is then taken and should the zero on the scale not coincide with the stationary zero mark, then the cam must be set back from the needle holder, until the two zeros coincide. For this purpose the shaft of the cam and the parts coöperating with the latter are all adjustably carried. Conveniently they are mounted in a casing or frame B²¹ hinged at B²² to the machine frame. This frame can be turned on its hinge B²² by a micrometer screw B²³ which engages a lug on the casing B²¹. The lug is embraced by a strap B²⁴ secured to the machine frame and carrying a spring-controlled push piece B²⁶ to hold the casing against the adjusting screw B²³. This screw is adjusted for each standard matrix or depth gage as much as is necessary to bring the stationary zero mark and the zero on the cam scale into register, while the cam is in contact with the needle holder. When this reading is obtained, then the cutters or that one acting on the character end of the matrix are or is set accordingly.

Each cutter is provided with a setting device including a micrometer screw. The cutter C has a setting handle J and the cutter C' a similar handle J' (see Fig. 3). These handles have each a screw or worm $j$ gearing with a toothed wheel $j'$ on the respective cutter bearings which latter are screwed externally and pass through internally screwed sleeves. The bearings may be advanced or withdrawn to move the cutters nearer to or farther away from each other (see Fig. 6).

The cutting mechanism having been adjusted to accord with the reading of micrometer screw B²³ the latter is turned back to zero and a rough matrix is delivered to the carrier A and passed between the cutters, after which it is again brought opposite to the needle in contact with gage O and the cam B¹⁴ once more advanced to test the adjustments. Should the matrix not prove to be of such dimensions that the zero of cam scale B¹⁶ coincides with the fixed zero mark, the departure from standard will be read on micrometer screw B²³ and the cutter C' will be readjusted so that when another rough matrix passes between the cutters it will be milled to accurate dimensions. After the described measurements and adjustments have been effected pressure on lever B¹⁵ is withdrawn, cam B¹⁴ is retracted by its spring until it moves clear of the needle carrier, and micrometer screw B²³ is set to zero.

The cutters, once set to accurately mill a matrix of a particular sort, or with a particular character, will be accurately set for all matrices of that sort and need not be readjusted for that particular kind of matrix until either by wear of the cutters or the needle, a sufficient inaccuracy arises to require resetting. This can always be discovered by testing a milled matrix by the mechanism B².

The automatic movement of the needle B to accurately position each matrix Y in the carrier A is obtained from the mechanism B' which comprises the sliding cam piece B³ (see Fig. 6) with the groove in which a block B⁰ on the needle holder engages. When this cam-piece is moved forward the needle is advanced until the block B⁰ engages a stop B²⁵ (see Fig. 6). In moving forward, the needle engages the matrix in the carrier and positions it correctly by moving it longitudinally until the surface engaged by the point of the needle is brought into a predetermined position at the extreme of the travel of said needle as determined by its engagement with stop B²⁵. To the cam-piece is connected by means of a stud one end of a lever B⁴ (see Fig. 2) pivoted at $b'$ and having its other end connected to an arm B⁵ (see Fig. 4) carried by a shaft B⁶ at the other end of which is a bell-crank lever B⁷ (see Fig. 11) one arm of which latter engages a cam B⁸ on the cam shaft Z and the other a cam B⁹ also on the same shaft.

Owing to the delicacy of the parts, the forward movement of the needle if positively performed is liable to result in damaging it or driving the point of it into the matrix which is usually of copper; therefore it is preferred to yieldingly advance the needle by the spring $B^{12}$ and control and measure said advance by the cam piece against one inclined wall of which block $B^9$ is held by said spring. The forward movement of the cam piece permits the advance of the needle under the action of the spring while the backward movement of the cam piece compels retraction of the needle.

A spring $B^{13}$ acting on the bell crank lever $B^7$ tends to keep this in contact with the cam $B^9$ (see Figs. 11 and 12) and the needle advancing cam $B^8$ is so shaped as to operate on lever $B^7$ only when the positioning movement is called for.

When the gaging mechanism $B^2$ is to act upon the needle in the manner hereinbefore described, it is necessary that the cam-piece $B^3$ should be withdrawn and for this purpose the lever $B^4$ is provided with a handle $B^{27}$ (see Fig. 2) which when pressed down withdraws the cam from engagement with the block on the needle holder.

The matrix carrier at the beginning of the cycle is in position to receive a matrix from the delivery galley E, which is also the discharging position (see Fig. 7).

The matrices to be treated are stored in the galley E which is arranged in a horizontally inclined position (see Figs. 2 and 7 to 10) the matrices being pressed toward the outlet or lower end by a weighted follower $e$ in a known manner. The outlet from the galley is normally closed by the pusher D which is mounted to move to and fro in suitable bearings in the cradle F which supports the delivery and receiving galleys E E' and the carrier A. When the carrier is in this position the pusher D is advanced by the cam $D^{10}$ on the shaft Z first to discharge a finished matrix from the carrier, and at the opposite side of the latter to that on which the matrices are delivered to the carrier. The pusher is then drawn back to uncover the outlet of the delivering galley E (see Fig. 15) and allow the leading matrix to fall into the path of the pusher which is again advanced and deposits the matrix in the carrier. The movements of the pusher are derived from the cam $D^{10}$ conveniently through a lever $D^2$ fulcrumed at $d$ (see Fig. 12) and having one end engaging the cam while the other is connected to the pusher D by a detachable link $D^3$ (see Figs. 1 and 5).

It is sometimes required that a matrix should not be discharged from the carrier in every cycle of the machine, as for example when a matrix has not been brought to proper dimensions with one operation of the cutters, or when it is desired to test the accuracy of the machine, by the mechanism $B^2$. A matrix will remain in the carrier if and so long as the pusher D is disconnected or rendered inoperative. For this purpose the pivot $d$ of the lever $D^2$ is carried on a boss $d'$ fast on a shaft $d^2$ (see Figs. 11 and 12) and the latter is provided with a handle H by turning which from the position shown in full lines in Fig. 11 to that shown in broken lines in the same figure, the end of the lever $D^2$ is removed from contact with the cam $D^{10}$, the joints between the lever $D^2$, the pusher D and the link $D^3$ being of such a nature as to permit of this movement.

From the matrix receiving position (see Fig. 7) the carrier is moved to a position opposite the needle B (see Fig. 8) and on reaching this position, where a short halt or rest in the carrier's movement takes place, the needle B is advanced to accurately position the matrix in the carrier by the mechanism already described, after which the carrier conveys the matrix between the cutters C C' (see Figs. 9 and 10) where it is milled and finally the carrier moves back to the delivery position.

The matrix is delivered from the carrier by the pusher D as stated, and is deposited in a channel at the entrance to the receiving galley E' into which it is moved laterally by a pusher $D^{11}$, the latter engaged by a lever $D^{50}$ advanced by a cam $D^{20}$ (see Figs. 14 and 15) and returned by a spring $D^{12}$.

The carrier is provided with a seat A' for the matrix, said seat being formed between fixed and movable jaws each provided with an angular groove for receiving opposite corners of the matrix, the receiving ends of said grooves being slightly beveled to facilitate the entrance of the matrix when projected from the delivery galley. The movable jaw $A^2$ of the matrix seat slides in a guide $a^{10}$ on the carrier and is provided with a pin $a^{11}$ (Fig. 10) which abuts against the rear end of said guide to limit the forward movement of said jaw. Movable in guides in the carrier in rear of jaw $A^2$ is a head $a^{13}$ to which is secured a headed pin $a^{14}$, the latter passing through a sliding head $A^7$ carrying a roller $A^6$ engaging a cam $A^5$ the latter turning on shaft $a$. Between jaw $A^2$ and head $a^{13}$ is interposed a spring $A^3$ and between heads $a^{13}$ and $A^7$ is interposed another and stronger spring $A^{13}$. Spring $A^3$ serves to project jaw $A^2$ and contract the seat A' so that when a matrix is inserted from the end thereof said jaw $A^2$ will be forced back and caused to grasp the inserted matrix with a light pressure, sufficient in degree to retain the matrix and at the same time permit longitudinal displacement thereof by the needle when brought into contact therewith. Spring $A^7$ forms a yielding connection between the jaw and its actuating cam. The cam $A^5$ is turned in one direction, to advance the jaw, by a link $A^8$ connected to a lever $A^9$ which is secured to a sleeve $A^{12}$ carried loosely on the shaft $A^{22}$ and to this sleeve is fixed an arm $A^{11}$ which engages a cam $A^{20}$ on the cam shaft Z. When the cam is turned in the opposite direction the jaws open.

The speed of travel of the carrier is reduced as stated, when the cutters are in action, by the variable speed gear N which is automatically brought into operation and which is preferably of the epicyclic type.

During the major portion of the cycle of operations, this gear is idle as a speed-reducing gear. It is mounted on a shaft $N'$ to which motion is communicated by double belt and pulley gear $N^2$ $N^3$. The gear N when high speed drive is in use acts to lock the driving pulleys to the shaft $N'$. Motion is taken from the shaft $N'$ and communicated to the cam shaft Z by a pinion $N^4$ on the shaft $N'$ gearing with the idle pinion $N^5$ which also gears with a pinion $Z'$ carried by one member of a clutch on the cam shaft Z.

Connected to the pulley $N^2$ which is loose on the shaft $N'$ is a pinion $N^6$ of the gear N. This pinion gears with members $N^7$ of double pinions carried on a disk $N^9$ and the other members of the double pinions $N^7$ gear with a pinion $N^{10}$ fast on the shaft N. Pulley $N^3$ is mounted to rotate on a sleeve attached to disk $N^9$ and is connected to the latter through a friction clutch $N^{20}$.

When the carrier approaches or reaches the cutters, a projection $N^{11}$ on the cam shaft, or, as in the present embodiment, mounted upon the cam $D^{10}$, engages a trigger piece $N^{12}$ (see Fig. 13) carried on a pivoted pawl or stop $N^{13}$, and by turning the latter on its pivot $n^3$ against the action of a controlling spring $N^{14}$ causes the pawl to engage one or other tooth of a ratchet $N^{15}$ on the disk $N^9$ of the variable speed gear N. For high speed, the members of the gear interlock and the entire gear revolves bodily as one piece, the speed of the driving members or pulleys $N^2$ $N^3$ being transmitted to the pinion $N^4$ and thence to the cam shaft. When, however, the pawl $N^{13}$ engages and arrests disk $N^9$ the counter acting influence of pulley $N^3$ is suspended and the drive of the pulley $N^2$ is transmitted through the epicyclic gear to the pinion $N^4$ at a reduced speed. During the reduced speed the pulley $N^3$ is idle and slips.

Conveniently the pawl $N^{13}$ is connected to its support through a dashpot device $N^{16}$ for absorbing shock and the trigger $N^{12}$ is also resiliently supported by a spring $N^{17}$ (see Figs. 10, 11 and 13.)

The needle B, either when positioning a matrix or measuring the depth of the drive therein, must make contact with part of the face of the character, and as each character is different from another in formation, the carrier A should be adjustable in two directions relatively to the needle B while maintaining the face or end of the matrix body Y in constant relation with the anvil O. For this purpose the shaft $a$ of the carrier is rotatably mounted in the cradle F which carries the galleys E E' and is mounted so as to be capable of turning on or with a shaft $f$ (see Figs. 7 to 10). The movements of adjustment of the cradle F and carrier A are controlled by two cams $F'$ $F^2$ mounted co-axially, the cam $F'$ being controlled by a handle $F^3$ and the cam $F^2$ by a handle $F^4$. The cam $F'$ acts upon one end of a pivoted lever $F^5$ the other end of which bears upon a sliding bolt $F^6$ which acts upon a horizontally arranged bar $F^7$. The ends of the bar $F^7$ are carried in arms $F^8$ pivotally supported on the carrier shaft $a$. The lever $F^5$ and the bar $F^7$ are connected together by a spring $F^{10}$. The carrier A when in position in line with the needle B bears against the bar $F^7$ (see Fig. 8) so that the position of the matrix horizontally can be adjusted and determined by the movements of the bar by the cam $F'$. The cam $F^2$ acts upon a stud $F^9$ in a downwardly extending member of the cradle F (see Fig. 7) and when operated causes the carrier to turn around the shaft $f$, thus adjusting the carrier and therefore the matrix therein vertically relatively to the needle. The adjustments are carried out under the direct observation of the operator through the microscope G, the character being reflected by the mirror $g$ thereof (see Fig. 5$^a$). On account of these adjustments and as the carrier must come to rest at the receiving and delivering position so that the seat there registers with the galley openings and with the pusher D, mechanism is provided to insure this in all cases. A stop Q (see Figs. 5, 5$^a$, 7, 8 and 9) is operated from a cam $Q^{10}$ which acts on a sliding piece $Q'$ mounted in the machine frame and bearing against one end of a lever $Q^2$ pivoted at $Q^3$, the other end of which embraces the stop Q. This stop is normally held out of the path of the carrier by the cam but when released is advanced into said path by a spring $Q^4$ acting upon a bolt $Q^5$ which bears on the stop Q (see Figs. 5 and 5$^a$).

In order that the carrier driving mechanism may not be interfered with by the adjustments of the carrier as above referred to a spring coupling or spring-box $A^*$ is introduced conveniently between two parts of the link $A^{26}$ (see Fig. 10).

The cam shaft Z is in two parts placed end to end and coupled by a clutch $Z^2$ (see Figs. 4, 5, 12 and 13.) The clutch is normally held closed by a contractile band $Z^3$ between the meeting end of which is mounted a rocking piece $Z^4$ which when obstructed during the revolution of the clutch is rocked and forces the ends of the band Z³ apart thus opening the clutch.

The main starting handle M is connected to a pawl or stop M' which is normally forced into the path of the rocking piece Z⁴ by a spring-controlled bolt M². On the depression of the lever M the pawl is withdrawn against the power of the spring, and the clutch closes to transmit the drive and will remain closed until the passage of the piece Z⁴ is again obstructed.

When the clutch Z² is opened by the operation of the lever M the carrier will be arrested in the position opposite the needle B, so that the accuracy of a matrix can be tested. Another handle P is provided and is connected to a pawl or stop P' (see Figs. 13 and 15). By turning the handle P the stop P' will be projected into the path of the rocking piece Z⁴ and effect the opening of the clutch at the required point to stop the carrier at the galleys.

To enable the parts to be moved readily by hand, a hand wheel R is mounted on a shaft R' which carries a pinion R² gearing with the pinion Z'.

By releasing the strap or catch B²⁴ from the casing B²¹ this latter can be turned down on its hinge to allow the needle and needle holder to be withdrawn.

Access can be had to the cutters by disconnecting the link D³ and a catch securing the galleys E E' in position. These can then be turned on axis out of the way.

The cutters can be released by unscrewing the rods C²⁰ C²¹ by which they are retained; the rod C²¹ is accessible from the outside of the machine, but the rod C²⁰ being inaccessible from the outside is provided with a sliding and rotatable spanner C²² (see Fig. 6).

Having thus described my invention what I claim is:

1. In a matrix machine furnished with a delivering galley, opposed milling cutters, and a measuring needle arranged respectively in position to register with a matrix held by a carrier; and in combination therewith a matrix carrier pivotally mounted in an adjustable cradle or frame, and movable to carry a matrix from the measuring needle to the cutters and from the cutters to the galley, adjusting mechanism acting upon the carrier, and adjusting mechanism acting upon the cradle; substantially as and for the purpose described.

2. In a matrix machine furnished with a delivering galley, opposed cutters, and a measuring needle arranged respectively in position to register with a matrix held by a carrier; and in combination therewith, an automatically operated matrix carrier pivotally mounted in a cradle or frame, and movable to carry a matrix from the measuring needle to the cutters and from the cutters to the galley, adjusting mechanisms for the carrier and the cradle and a stop for positioning the carrier to receive a matrix; substantially as described.

3. In a matrix machine the combination with an automatically moved matrix carrier mounted in a cradle, a matrix galley also mounted in the cradle, a measuring needle, and mechanism for adjusting the carrier and cradle relatively to the measuring needle, of a stop for positioning the carrier to receive a matrix from the galley and mechanism for advancing and withdrawing the stop; substantially as described.

4. In a matrix machine furnished with a matrix carrier and mechanism for delivering a matrix to the carrier, and in combination therewith a needle, automatic mechanism for controlling the advance of the needle to accurately position the matrix in the carrier, and adjustable hand operated mechanism for gaging the advance of the needle into a matrix held against an anvil, together with hand operated mechanism for disengaging the automatic mechanism when the hand measuring mechanism is in use; substantially as and for the purpose described.

5. In a matrix machine furnished with a movable carrier which conveys the matrix between delivering and receiving galleys, cutters and a positioning needle arranged in position to register respectively with a matrix held by the carrier; and in combination therewith, a driving mechanism for moving the carrier, embodying a clutch and devices for opening the clutch to arrest the carrier at different points in its travel with the matrix in registry with the galleys, cutters and needle, respectively; substantially as described.

6. In a matrix machine the combination with a matrix carrier and delivering and receiving galleys arranged on opposite sides of the carrier, of a reciprocating pusher, and automatic mechanism for operating the pusher to first discharge a finished matrix from the carrier to one galley and then deliver a rough matrix from the other galley to the carrier and an automatically operated pusher for the matrix in the receiving galley; substantially as and for the purpose described.

7. In a matrix machine the combination with a movable matrix carrier and a reciprocating pusher for feeding a matrix to and ejecting a matrix from the carrier, of a cam operated lever connected to the pusher, and hand-controlled mechanism for removing said lever from the cam or for rendering the pusher inoperative; substantially as and for the purpose described.

8. In a matrix machine furnished with a measuring needle and a matrix carrier, of a pivotally supported cradle in which the carrier is pivotally supported and which carries a matrix delivering galley, hand operated mechanism for adjusting the carrier on its support, and hand operated mechanism for adjusting the cradle on its support; substantially as and for the purpose described.

9. In a matrix machine the combination with an automatically operated carrier such as A having a matrix seat including a movable jaw $A^2$, of a light spring $A^3$ acting on the jaw and an automatically operated cam $A^7$ for acting on the jaw through a heavier spring $A^4$; substantially as and for the purpose described.

10. In a matrix machine the combination with a matrix carrier and mechanism for feeding a matrix to the carrier, of a needle, and an automatically operated piece $B^3$ and a spring $B^{12}$ for controlling the movements of the needle with relation to a fixed stop to accurately position a matrix in the carrier; substantially as described.

11. In a matrix machine the combination with a movable matrix carrier and mechanism for feeding a matrix to the carrier and for moving the carrier, of a spring controlled needle such as B in position to register with a matrix in the carrier, and hand-operated and electrically controlled measuring mechanism such as $B^2$ carried in a hinged support which is adjustable by means of a micrometer screw; substantially as and for the purpose described.

12. A matrix machine including, in combination, a movable carrier adapted to translate or convey the matrices singly through the machine; spaced milling cutters between which the carrier travels; a reciprocatory needle operating upon the matrix to shift the latter longitudinally to position it in the carrier, means for arresting the carrier opposite said needle, and actuating mechanism for moving the carrier and needle in timed relation to each other.

13. In a matrix machine provided with a movable matrix carrier equipped with gripping jaws and in combination therewith, a needle movable to a predetermined extent in a direction transverse to the path of the carrier, to engage and position a contained matrix in the jaws when the latter are in register with said needle and relaxed, and actuating devices coupling the carrier, needle and gripping jaw and operating the same in timed relation for automatic action.

14. In a matrix machine, the combination of the following elements, to wit: a movable matrix carrier provided with gripping jaws; a needle movable to a predetermined distance transversely of the path of the carrier to engage a contained matrix and position it in the gripping jaws while the latter are relaxed; and actuating devices coupling the carrier, jaws and needle to operate in timed relation the one to the other.

15. In a matrix machine, the combination of the following elements, to wit: a milling cutter; a matrix carrier movable past the milling cutter and provided with gripping jaws for sustaining a contained matrix; matrix feeding means for delivering successive matrices to the gripping jaws and depositing each out of register with the milling cutter; a movable needle adapted to advance to a predetermined point in a line transverse to the path of the carrier and in so doing to engage and shift the matrix at the time between the jaws while the latter are relaxed; means for effecting a dwell in the motion of the carrier when in register with the feeder and needle; and an actuating mechanism common to the carrier, gripping jaws, feeding device and needle for operating said elements automatically in timed relation one to another.

16. In a matrix machine, the combination of the following elements, to wit: a movable carrier provided with gripping jaws; a feeding mechanism for delivering successive matrices from a magazine to the gripping jaws; a movable gaging member or needle with a predetermined range of movement and operating to shift the matrix and gage its position in the jaws while the latter are relaxed; and automatic actuating devices for intermittently moving the carrier, operating the feeder, reciprocating the needle and opening and closing the gripping jaws in timed relation to effect delivery of a matrix to the gripping jaws and present the same opposite the needle while the jaws are relaxed, to then advance the needle into contact with the matrix and reposition the latter in the jaws, and subsequently close the jaws to retain the matrix in the gaged position determined by the previous advance of the needle.

17. A machine for automatically milling a series of matrices to gage the same including, in combination, the following elements, to wit: a milling cutter; a matrix carrier provided with gripping jaws; matrix storing and feeding devices located to one side the path of the carrier and adapted to deliver matrices one at a time between the gripping jaws and against a stop or abutment; a reciprocating needle adapted to contact with the matrix and shift the latter to a predetermined position in the jaws while the latter are relaxed; means for reciprocating the carrier and causing dwells opposite the feeding devices and needle; means for reciprocating the needle; means for actuating the feeder; means for closing the gripper jaws after the advance of the needle in engagement with the matrix; and actuating devices common to the carrier, gripper feeder and needle operating means to cause the same to operate in timed relation one to another, substantially as described.

18. In a matrix machine, the combination of the following elements, to wit: a movable carrier provided with matrix receiving jaws; supply and receiving galleys located on opposite sides of the path traversed by the carrier; and a pusher operating in conjunction with the supply galley and carrier to discharge a contained matrix from the carrier to the receiving galley and subsequently deliver a matrix from the supply galley to the carrier.

19. In a matrix machine provided with a milling cutter and a movable matrix carrier provided with an open-ended matrix seat, and in combination therewith, a supply galley located on one side and a receiving galley on the opposite side of the path of movement of the carrier, a pusher constituting the delivery gate of the supply galley and operating through the carrier to discharge a contained matrix to the receiving galley and subsequently to open the supply galley and advance a matrix therefrom into the carrier.

20. In a matrix machine, the combination of the following elements, to wit: a movable matrix carrier provided with gripping jaws, a matrix positioning mechanism for adjusting the matrix in the gripping jaws, a cutter for acting on the positioned matrix and a driving mechanism for the carrier embodying means for arresting the movement of the carrier while the matrix is being positioned, and differential gearing for moving the carrier from the positioning mechanism to the cutter at high speed and for moving the carrier during the action of the cutter on the matrix at a slower speed.

FRANK HINMAN PIERPONT.

Witnesses:
C. P. LIDDON,
O. J. WORTH.

Copies of this patent may be obtained for five cents each, by addressing the "Commissioner of Patents, Washington, D. C."